United States Patent
Zhicharevich et al.

(10) Patent No.: US 12,087,278 B2
(45) Date of Patent: Sep. 10, 2024

(54) DISFLUENCY REMOVAL USING MACHINE LEARNING

(71) Applicant: Intuit Inc., Mountain View, CA (US)

(72) Inventors: Alexander Zhicharevich, Petah Tikva (IL); Yair Horesh, Kfar Sava (IL)

(73) Assignee: Intuit Inc., Mountain View, CA (US)

( * ) Notice: Subject to any disclaimer, the term of this patent is extended or adjusted under 35 U.S.C. 154(b) by 250 days.

(21) Appl. No.: 17/378,386

(22) Filed: Jul. 16, 2021

(65) Prior Publication Data

US 2023/0020574 A1 Jan. 19, 2023

(51) Int. Cl.
| | |
|---|---|
| *G10L 15/02* | (2006.01) |
| *G06N 3/08* | (2023.01) |
| *G10L 15/06* | (2013.01) |
| *G10L 25/54* | (2013.01) |

(52) U.S. Cl.
CPC .......... *G10L 15/02* (2013.01); *G06N 3/08* (2013.01); *G10L 15/063* (2013.01); *G10L 25/54* (2013.01)

(58) Field of Classification Search
CPC ....... G10L 15/02; G10L 15/063; G10L 15/22; G10L 15/19; G10L 25/54; G06N 3/08; G06N 3/02; G06N 5/04; G06Q 10/063118; G06F 40/289; G06F 16/90335
See application file for complete search history.

(56) References Cited

U.S. PATENT DOCUMENTS

| | | | | |
|---|---|---|---|---|
| 11,114,113 B2 * | 9/2021 | Rentoumi | ............. | G16H 50/20 |
| 11,216,510 B2 * | 1/2022 | Jiang | ........................ | G06N 3/02 |
| 11,568,135 B1 * | 1/2023 | Mansour | ................ | G06N 20/00 |
| 11,580,145 B1 * | 2/2023 | Kumar | .................... | G06N 3/092 |
| 2007/0078642 A1 * | 4/2007 | Weng | ...................... | G10L 15/19 |
| | | | | 704/4 |

(Continued)

FOREIGN PATENT DOCUMENTS

WO WO-2012097504 A1 * 7/2012 ........ G06F 16/90335

OTHER PUBLICATIONS

Alexander Bartl and Gerasimos Spanakis, A retrieval-based dialogue system utilizing utterance and context embeddings, arXiv:1710.05780v3 [cs.CL] Oct. 20, 2017 (Year: 2017).*

(Continued)

*Primary Examiner* — Richemond Dorvil
*Assistant Examiner* — Nadira Sultana
(74) *Attorney, Agent, or Firm* — Lathrop GPM LLP

(57) ABSTRACT

A method may including obtaining a voice transcript corpus and a chat transcript corpus, extracting voice transcript sentences from the voice transcript corpus and chat transcript sentences from the chat transcript corpus, encoding, by a series of neural network layers, the voice transcript sentences to generate voice sentence vectors, encoding, by the series of neural network layers, the chat transcript sentences to generate chat sentence vectors, determining, for each voice sentence vector, a matching chat sentence vector to obtain matching voice-chat vector pairs, and adding, to a parallel corpus, matching voice-chat sentence pairs using the matching voice-chat vector pairs. Each of the matching voice-chat sentence pairs may include a voice transcript sentence and a matching chat transcript sentence. The method may further include training a disfluency remover model using the parallel corpus.

20 Claims, 10 Drawing Sheets

(56) References Cited

U.S. PATENT DOCUMENTS

| | | | |
|---|---|---|---|
| 2008/0046229 A1* | 2/2008 | Maskey | G06F 40/289 |
| | | | 704/2 |
| 2019/0213996 A1* | 7/2019 | Aaron | G10L 15/063 |
| 2021/0303775 A1* | 9/2021 | Deleuze | G06F 40/166 |
| 2021/0375289 A1* | 12/2021 | Zhu | G10L 15/22 |

OTHER PUBLICATIONS

Relmers, N., et al., "Sentence-BERT: Sentence Embeddings using Siamese BERT-Networks", Technische Universitat Darmstadt, Aug. 27, 2019, 11 pages.

Lou, P. J., et al., "End-to-End Speech Recognition and Disfluency Removal", Sep. 28, 2020, 11 pages.

Hu, Z., et al., "Text Style Transfer: A Review and Experimental Evaluation", Association for Computing Machinery, Apr. 11, 2021, 45 pages.

* cited by examiner

DISFLUENCY REMOVAL USING MACHINE LEARNING

BACKGROUND

Disfluencies are interruptions in the regular flow of speech, such as using filler words (e.g., uh and um), repeating words, or contradicting (e.g., correcting) something said previously. Disfluencies are common in voice conversations, and thus disfluencies are common in voice transcripts that are automatically generated from recordings of voice conversations. The presence of disfluencies may distort the syntax and/or semantics of voice transcripts, causing difficulties in the application of machine learning techniques to generate transcripts from voice. Although machine learning techniques have been used to improve the quality of voice transcripts, these techniques have not effectively addressed the problem of removing disfluencies from voice transcripts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a voice transcript corpus and a chat transcript corpus, extracting voice transcript sentences from the voice transcript corpus and chat transcript sentences from the chat transcript corpus, encoding, by a series of neural network layers, the voice transcript sentences to generate voice sentence vectors, encoding, by the series of neural network layers, the chat transcript sentences to generate chat sentence vectors, determining, for each voice sentence vector, a matching chat sentence vector to obtain matching voice-chat vector pairs, and adding, to a parallel corpus, matching voice-chat sentence pairs using the matching voice-chat vector pairs. Each of the matching voice-chat sentence pairs includes a voice transcript sentence and a matching chat transcript sentence. The method further includes training a disfluency remover model using the parallel corpus.

In general, in one aspect, one or more embodiments relate to a system including a computer processor, a repository configured to store a voice transcript corpus and a chat transcript corpus, and a transcription application executing on the computer processor and configured to extract voice transcript sentences from the voice transcript corpus and chat transcript sentences from the chat transcript corpus, encode, by a series of neural network layers, the voice transcript sentences to generate voice sentence vectors, encode, by the series of neural network layers, the chat transcript sentences to generate chat sentence vectors, determine, for each voice sentence vector, a matching chat sentence vector to obtain matching voice-chat vector pairs, and add, to a parallel corpus, matching voice-chat sentence pairs using the matching voice-chat vector pairs. Each of the matching voice-chat sentence pairs includes a voice transcript sentence and a matching chat transcript sentence. The transcription application is further configured to train a disfluency remover model using the parallel corpus.

In general, in one aspect, one or more embodiments relate to a method including sending a voice transcript sentence to a transcription application. The transcription application is configured to perform obtaining a voice transcript corpus and a chat transcript corpus, extracting voice transcript sentences from the voice transcript corpus and chat transcript sentences from the chat transcript corpus, encoding, by a series of neural network layers, the voice transcript sentences to generate voice sentence vectors, encoding, by the series of neural network layers, the chat transcript sentences to generate chat sentence vectors, determining, for each voice sentence vector, a matching chat sentence vector to obtain matching voice-chat vector pairs, and adding, to a parallel corpus, matching voice-chat sentence pairs using the matching voice-chat vector pairs. Each of the matching voice-chat sentence pairs includes a voice transcript sentence and a matching chat transcript sentence. The transcription application is further configured to perform training a disfluency remover model using the parallel corpus, applying the disfluency remover model to the voice transcript sentence to generate an improved voice transcript sentence, and transmitting the improved voice transcript sentence. The method further includes receiving, from the transcription application, the improved voice transcript sentence.

Other aspects of the invention will be apparent from the following description and the appended claims.

DETAILED DESCRIPTION

Figure 1A:
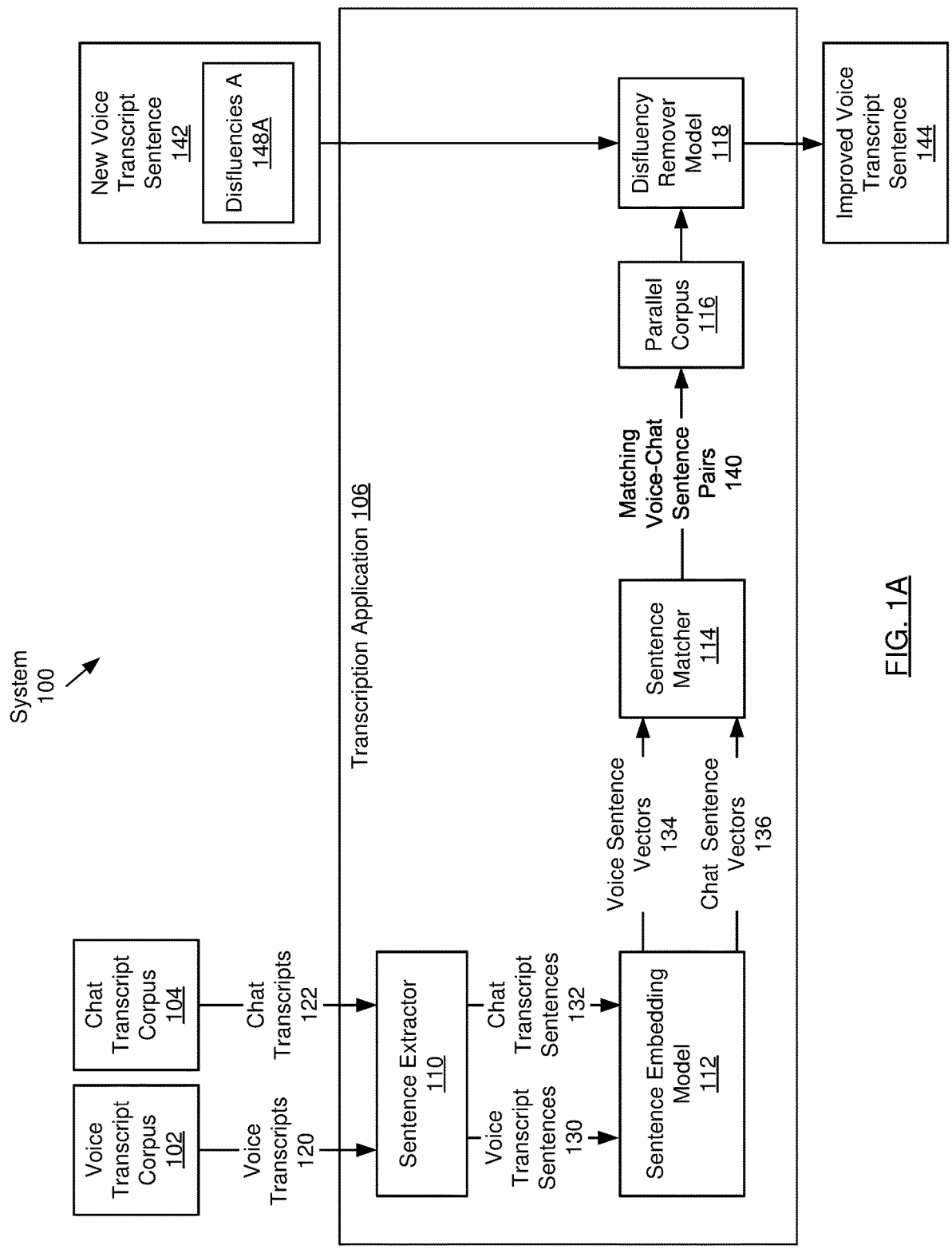
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to removing disfluencies from a voice transcript generated, for example, using automated speech to text conversion. A disfluency is an interruption in the regular flow of voice communication. Examples of disfluencies include: filler words (e.g., uh and um), repeating words, and contradictions (e.g., corrections) of a previous portion of the voice communication. In contrast, chat transcripts may exclude disfluencies. For example, chat transcripts may be generated from online chat (e.g., textual) interactions between a customer and a call center agent. Voice transcripts and chat transcripts may be semantically similar despite the voice transcripts including disfluencies, and the chat transcripts excluding disfluencies.

Thus, one or more embodiments are directed to training a disfluency remover model to remove disfluencies from voice transcripts using chat transcripts. A disfluency remover model may be trained to learn the relationship between voice transcript sentences represented in a disfluency-including style and matching chat transcript sentences represented in a disfluency-free style. However, because individuals generally do not both type and speak a conversation at the same time, voice transcript sentences are not natively matched to chat transcript sentences. For example, the voice transcript sentences may be in one conversation and the chat transcript sentences may be in another conversation. Thus, to train a disfluency remover model to remove disfluencies from voice transcripts using chat transcripts, one or more embodiments are directed to determining when voice transcript sentences matched to chat transcript sentences.

To match voice and chat transcript sentences, voice transcript sentences and chat transcript sentences are extracted from a voice transcript corpus and a chat transcript corpus. The voice transcript sentences and chat transcript sentences are encoded by a sentence embedding model to generate voice sentence vectors and chat sentence vectors. The sentence embedding model may be a pre-trained neural network for natural text understanding trained using pairs of sentences. For example, each pair of sentences used to train the sentence embedding model may be labeled "similar" or "dissimilar" The sentence embedding model learns to predict whether a new pair of sentences are semantically similar. A matching chat sentence vector is determined for each voice sentence vector, for example, by comparing vector distances between the voice sentence vector and the chat sentence vectors. Thus, pairs having a voice sentence vector and a matching chat sentence vector are defined. From each pair, a matching chat transcript sentence corresponding to the matching chat sentence vector and the voice transcript sentence corresponding to the voice sentence vector are added to a parallel corpus. The parallel corpus may then be used to train the disfluency remover model.

The disfluency remover model may be a sequence-to-sequence model that includes functionality to generate an improved voice transcript sentence from a new voice transcript sentence. The new voice transcript sentence may include disfluencies and the improved voice transcript sentence may exclude the disfluencies.

FIG. 1A shows a diagram of a system (100) in accordance with one or more embodiments. As shown in FIG. 1A, the system (100) includes multiple components such as a voice transcript corpus (102), a chat transcript corpus (104), a transcription application (106), a new voice transcript sentence (142), and an improved voice transcript sentence (144). Each of these components is described below.

Figure 1B:
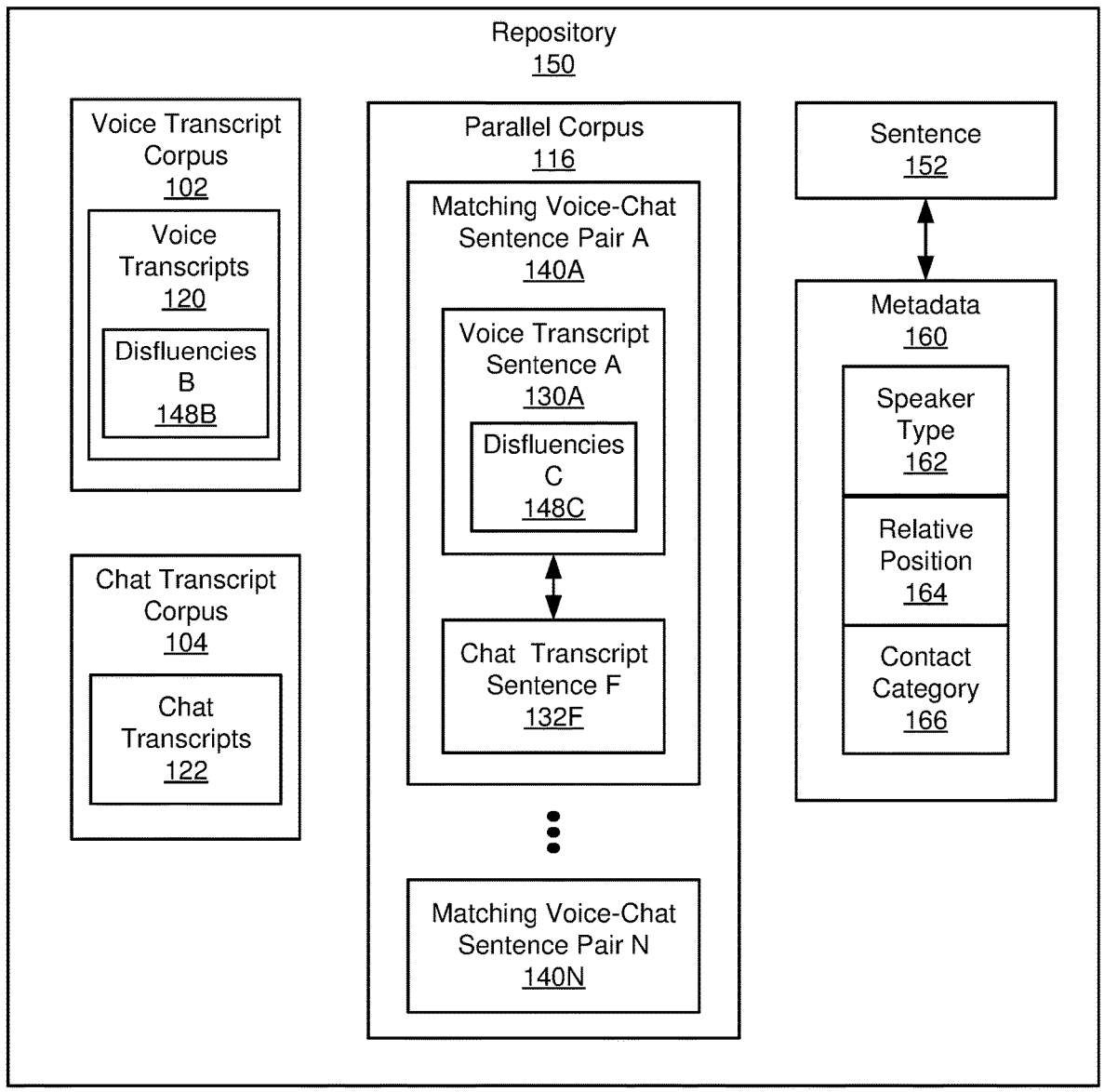

The voice transcript corpus (102) and the chat transcript corpus (104) are used as input into the transcription application (106) and are described with reference to FIG. 1B. Turning to FIG. 1B, a voice transcript corpus (102) is a collection of voice transcripts (120). Each voice transcript is a textual record of voice communications among two or more channels. Specifically, a voice transcript is a verbatim record of the voice communication. A channel may be a source of communication. For example, the communication may be between a customer channel and a call center agent channel. As another example, the channel may correspond to a party to a conference call. As another example, in the case of single party communication, a channel may be a mode of a personal recording. Voice transcripts (120) may include disfluencies (148B). A disfluency is an interruption in the regular flow of voice communication (e.g., speech). Examples of disfluencies include: filler words (e.g., uh and um), repeating words, contradictions (e.g., corrections) of a previous portion of the voice communication, etc.

A chat transcript corpus (104) is a collection of chat transcripts (122). Each chat transcript is a textual record of textual communications among two or more channels. In contrast to a voice transcript (120), a chat transcript (122) may exclude disfluencies. For example, while disfluencies are common in voice communications, disfluencies rarely occur in textual communications.

The voice transcript corpus (102) and the chat transcript corpus (104) may be included in a repository (150). The repository (150) is any type of storage unit and/or device (e.g., a file system, database, collection of tables, or any other storage mechanism) for storing data. Further, the repository (150) may include multiple different storage units and/or devices. The multiple different storage units and/or devices may or may not be of the same type or located at the same physical site. The repository (150) may be accessed online via a cloud service (e.g., Amazon Web Services, Egnyte, Azure, etc.).

Figure 5A:
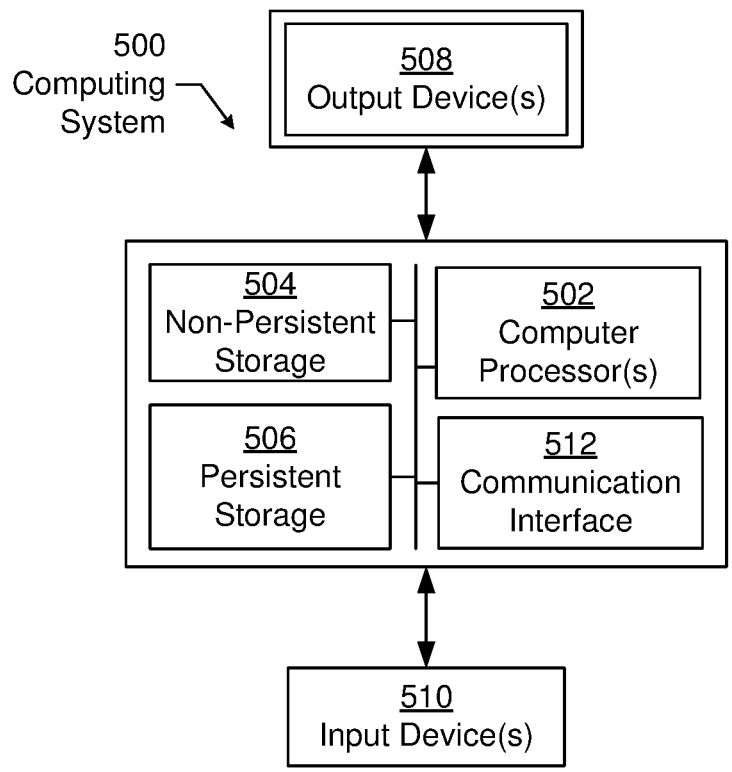
FIG. 5A and FIG. 5B show computing systems in accordance with one or more embodiments of the invention.
Figure 5B:
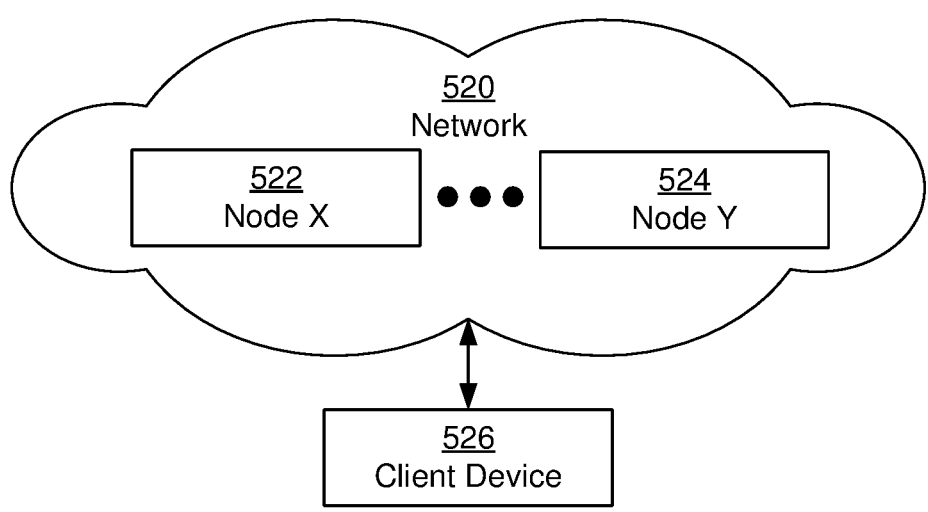

Returning to FIG. 1A, voice transcripts (120) from the voice transcript corpus (102) and chat transcripts (122) from the chat transcript corpus are provided to the transcription application (106). The transcription application (106) is configured to self-train and remove disfluencies from voice transcripts. The transcription application (106) may be a single application or program or a collection of applications or programs. The transcription application (106) includes a sentence extractor (110), a sentence embedding model (112), a sentence matcher (114), a parallel corpus (116), and a disfluency remover model (118). The transcription application (106) may execute on a server or other computing system. The server or other computing system may take the form of the computing system (500) shown in FIG. 5A connected to a network (520) as shown in FIG. 5B.

The sentence extractor (110) includes functionality to extract (e.g., parse), from a voice transcript (120), one or more voice transcript sentences (130). Similarly, the sentence extractor (110) includes functionality to extract, from a chat transcript (122), one or more chat transcript sentences (132). Each voice transcript sentence (130) and each chat transcript sentence (132) is a textual unit including one or more tokens that are grammatically linked. Each token may be an alphanumeric string. For example, a token may include a single term, multiple terms, numerical expression, etc. A variety of techniques may be used to implement the sentence extractor (110), including: rule-based techniques, statistics-based techniques, classification techniques, logistic regression, etc. In the voice transcript sentence, a token may include a disfluency.

Returning to FIG. 1B, a sentence (152) (e.g., a voice transcript sentence (130A) or a chat transcript sentence (132F)) may have corresponding metadata (160). The metadata (160) includes a speaker type (162), a relative position (164) and/or a contact category (166). The speaker type (162) is a category of speaker. For example, for a call center voice transcript or chat transcript, the speaker type (162) may be "customer support agent" or "customer." The relative position (164) identifies the position of the corresponding sentence (152) within the transcript that includes the sentence (152). For example, the relative position (164) may be "beginning", "middle," or "end." The contact category (166) identifies a category of the transcript that includes the sentence (152). For example, the contact category (166) for a call center voice transcript or chat transcript may be assigned by a customer support agent. Examples of contact categories may include: banking, bank transaction, user management, login issue, password reset, accounting, invoicing, etc. The contact categories may be organized into a graph (e.g., a tree) of contact categories. The repository (150) may further include the metadata (160) corresponding to each sentence (152).

Returning to FIG. 1A, the sentence embedding model (112) is a machine learning model that includes functionality to generate voice sentence vectors (134) from voice transcript sentences (130). The voice sentence vectors (134) are vector representations of the corresponding voice transcript sentences (130). In one or more embodiments, the voice sentence vectors (134) have fixed dimensionality. For example, the sentence embedding model (112) may include a pooling layer to derive fixed-size voice sentence vectors (134). The size of the voice sentence vector (134) may be independent of the length of the voice transcript sentences (130) being encoded. Similarly, the sentence embedding model (112) includes functionality to generate chat sentence vectors (136) from chat transcript sentences (132).

The sentence embedding model (112) may be a pre-trained model for natural text understanding trained using pairs of sentences (e.g., Sentence-Bidirectional Encoder Representations from Transformers (Sentence-BERT)). For example, each pair of sentences used to train the sentence embedding model (112) may be labeled as "similar" or "dissimilar." The sentence embedding model (112) learns to predict whether a new pair of sentences are semantically similar. For example, a pair of sentences may be semantically similar when the pair of sentences are encoded as similar sentence vectors. Continuing this example, a pair of sentence vectors may be similar when the cosine similarity between the pair of sentence vectors is within a threshold value. Since the presence of disfluencies (148B) in voice transcripts (120) generally does not change the semantics of the voice transcripts (120), voice transcript sentences (130) and chat transcript sentences (132) with similar semantics may correspond to similar vector representations.

The sentence embedding model (112) may include a Siamese network. A Siamese network includes two identical replicas of neural network layers with the same structure and the same weights. One or more layers in the replicas of neural network layers are fully connected layers. A Siamese network is trained to learn a similarity function that compares inputs without classifying the inputs. For example, each of the two sentences in a pair of sentences used to train the sentence embedding model (112) may be embedded by a different replica of the neural network layers.

The sentence matcher (114) includes functionality to add matching voice-chat sentence pairs (140) to the parallel corpus (116) using the voice sentence vectors (134) and chat sentence vectors (136). Returning to FIG. 1B, the repository (150) may further include the matching voice-chat sentence pairs (140A, 140N) of the parallel corpus (116). A matching voice-chat sentence pair (140A) includes a voice transcript sentence (130A) and a chat transcript sentence (132F). The voice transcript sentence (130A) may include disfluencies (148C).

Returning to FIG. 1A, the matching voice-chat sentence pairs (140) of the parallel corpus (116) are used to train the disfluency remover model (118). The disfluency remover model (118) includes functionality to convert a new voice transcript sentence (142) to an improved voice transcript sentence (144). The new voice transcript sentence (142) is a sentence in a new voice transcription that is the target of disfluency removal. Although not shown, the new voice transcription may be preprocessed, such as through the sentence extractor (110) to partition the new voice transcription into sentences. The new voice transcript sentence (142) may include disfluencies (148A) and the improved voice transcript sentence (144) may exclude disfluencies. In other words, the disfluency remover model (118) may convert a new voice transcript sentence (142) represented in a style that includes disfluencies (148A) to an improved voice transcript sentence (144) represented in a style that excludes disfluencies. One or more of the disfluencies (148A) may include a repeating portion of the new voice transcript sentence (142). One or more of the disfluencies (148A) may include a contradictory portion of the new voice transcript sentence (142).

The disfluency remover model (118) may be a sequence-to-sequence model that includes an encoder and a decoder. The encoder and the decoder are deep learning machine learning models. Deep learning, also known as deep structured learning or hierarchical learning, is part of a broader family of machine learning methods based on learning data representations, as opposed to task-specific algorithms. The encoder and the decoder may each be a neural network, such as a gated recurrent network (GRU), and recurrent neural networks (RNN). In other words, the system may have two neural networks, one for the encoder and one for the decoder.

A GRU and a RNN are networks that operate on a sequence and uses its own output as input for subsequent steps. The GRU and RNN may each be single or multiple layers. Further, the GRU or RNN may each be a long short-term memory (LSTM) network. The expression long short-term refers to the fact that LSTM is a model for the short-term memory which can last for a long period of time. LSTM units are the building blocks of the layers of the neural network in one or more embodiments.

The encoder may encode the new voice transcript sentence (142) as a context vector. The context vector is a vector representation of the new voice transcript sentence (142). The context vector is a hidden state of the encoder and encodes the meaning behind the new voice transcript sentence (142). The contextual meaning is represented with numeric values in the context vector. In one or more embodiments, the context vector has fixed dimensionality. The size of the context vector is independent of the length of the new voice transcript sentence (142) being encoded. In one or more embodiments, context vector is a numeric sequence.

The encoder may include a word to indices mapping. The word to indices mapping may be referred to as an encoder dictionary. The word to indices mapping maps individual words of the input to an index value. A set of words are selected based on frequency of use in the user support system. Each word in the set of words has a unique location in a vector space. The words to indices mapping defines the location of the words in the vector space. When mapping a new voice transcript sentence (142), each word may be a one-hot vector, or giant vector of zeros except for a single one at the index of the word. Thus, for example, the word to indices mapping may map the word "problem" in the phrase "I am having a problem with . . . " to 05, which is represented by the vector [0 0 0 0 0 1 0 0 0 . . . ].

The decoder may generate the improved voice transcript sentence (144) from the context vector. Similar to the encoder, the decoder may include an indices to word mapping. The indices to word mapping has the same characteristics as described with respect to the word to indices mapping. The indices to word mapping maps index values to words. The indices to word mapping may be referred to as a decoder dictionary. The encoder dictionary and the decoder dictionary may be the same in one or more embodiments. For example, the encoder dictionary may represent the same set of words as the decoder dictionary. By way of another example, the same word in the encoder dictionary and the decoder dictionary may be mapped to the same index values in the different dictionaries.

The transcription application (106) includes functionality to receive the new voice transcript sentence (142), directly or indirectly, from a user and to transmit the improved voice transcript sentence (144), directly or indirectly, to the user. For example, the user may display the improved voice transcript sentence (144) in a graphical user interface (GUI) of a user computing system. In one or more embodiments, the user computing system provides, to a user, a variety of computing functionality. For example, the computing functionality may include word processing, multimedia processing, financial management, business management, social network connectivity, network management, and/or various other functions that a computing device performs for a user.

The user computing system may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system may take the form of the computing system (500) shown in FIG. 5A connected to a network (520) as shown in FIG. 5B. The GUI of the user computing system may be rendered and displayed within a local desktop software application or the GUI may be generated by a remote web server and transmitted to a user's web browser executing locally on a desktop or mobile device.

While FIG. 1A shows a configuration of components, other configurations may be used without departing from the scope of the invention. For example, various components may be combined to create a single component. As another example, the functionality performed by a single component may be performed by two or more components.

Figure 2:
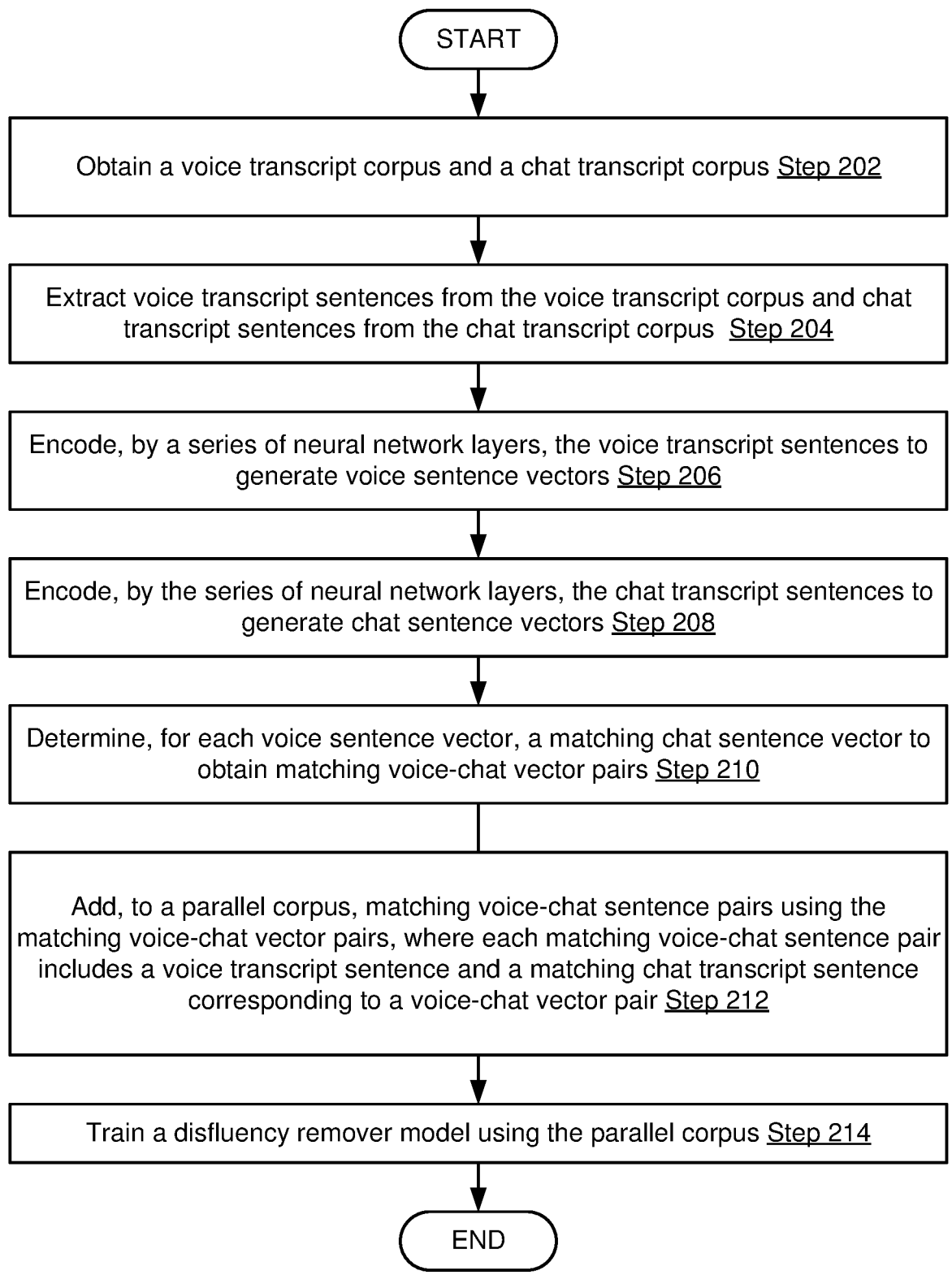
FIG. 2 and FIG. 3 show flowcharts in accordance with one or more embodiments of the invention.

FIG. 2 shows a flowchart in accordance with one or more embodiments of the invention. The flowchart depicts a process for improving a voice transcript. One or more of the steps in FIG. 2 may be performed by the components (e.g., the sentence extractor (110), sentence embedding model (112), sentence matcher (114), and disfluency remover model (118) of the transcription application (106)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a voice transcript corpus and a chat transcript corpus are obtained. The transcription application may obtain the voice transcript corpus and the chat transcript corpus from a repository. The voice transcript corpus may include voice transcripts generated by a speech recognition processor from audio recordings (e.g., audio recordings of call center interactions between customers and call center agents).

In Step 204, voice transcript sentences are extracted from the voice transcript corpus and chat transcript sentences are extracted from the chat transcript corpus. The sentence extractor may extract the voice transcript sentences and the chat transcript sentences using a variety of techniques, including: rule-based techniques, statistics-based techniques, classification techniques, logistic regression, etc. The transcription application may label the voice transcript sentences and the chat transcript sentences with metadata (e.g., a speaker type, a relative position and/or a contact category).

In Step 206, voice transcript sentences are encoded by a series of neural network layers to generate voice sentence vectors. The series of neural network layers may be one of a Siamese pair of identical replicas of neural network layers in a sentence embedding model, where each of the identical replicas of neural network layers have the same structure and the same weights.

In Step 208, chat transcript sentences are encoded by the series of neural network layers to generate chat sentence vectors (see description of Step 206 above).

In Step 210, a matching chat sentence vector is determined for each voice sentence vector. The sentence matcher may determine the matching chat sentence vector for the voice sentence vector by: 1) calculating vector distances between the voice sentence vector and the chat sentence vectors; and 2) determining that a vector distance between the voice sentence vector and the matching chat sentence vector is within a threshold. For example, the vector distances may be the cosine similarities between the voice sentence vector and the chat sentence vectors.

To improve the efficiency of the search for the matching chat sentence vector, the sentence matcher may construct an approximate nearest neighbor (ANN) index over the chat sentence vectors and determine the matching chat sentence vector using the ANN index. The ANN index is a data structure that leverages implicit neighborhoods to organize the chat sentence vectors into a tree.

The sentence matcher may narrow the search for the matching chat sentence vector by comparing the metadata labeling the voice transcript sentence corresponding to the voice sentence vector and the metadata labeling the chat transcript sentence corresponding to the chat sentence vector. For example, both the voice transcript sentence and the matching chat transcript sentence may be labeled with metadata indicating that the speaker type is "customer," the relative position is "end," and the contact category is "login problem." In other words, when the metadata labeling the voice transcript sentence and the chat transcript sentence match, the voice transcript sentence and the chat transcript sentence are more likely to be semantically similar.

In Step 212, matching voice-chat sentence pairs each including a voice transcript sentence and a matching chat transcript sentence are added to a parallel corpus. Each voice transcript sentence and matching chat transcript sentence corresponds to a voice sentence vector and matching chat sentence vector determined by the sentence matcher in Step 210 above. Although the voice transcript sentence is represented in a disfluency-including style and the matching chat transcript sentence is represented in a disfluency-excluding style, the voice transcript sentence and the matching chat transcript sentence may represent similar semantics.

In Step 214, a disfluency remover model is trained using the parallel corpus. Training the disfluency remover model using a parallel corpus that includes matching pairs of voice transcript sentences and chat transcript sentences enables the disfluency remover model to learn the relationship between sentences represented in a disfluency-including style and sentences represented in a disfluency-free style.

The transcription application may apply the disfluency remover model to a new voice transcript sentence to generate an improved voice transcript sentence. The new voice transcript sentence may include one or more disfluencies and the improved voice transcript sentence excludes the one or more disfluencies. The disfluency remover model may encode the new voice transcript sentence as a context vector that represents a hidden state that encodes the meaning behind the new voice transcript sentence. The disfluency remover model may generate the improved voice transcript sentence from the context vector.

Figure 3:
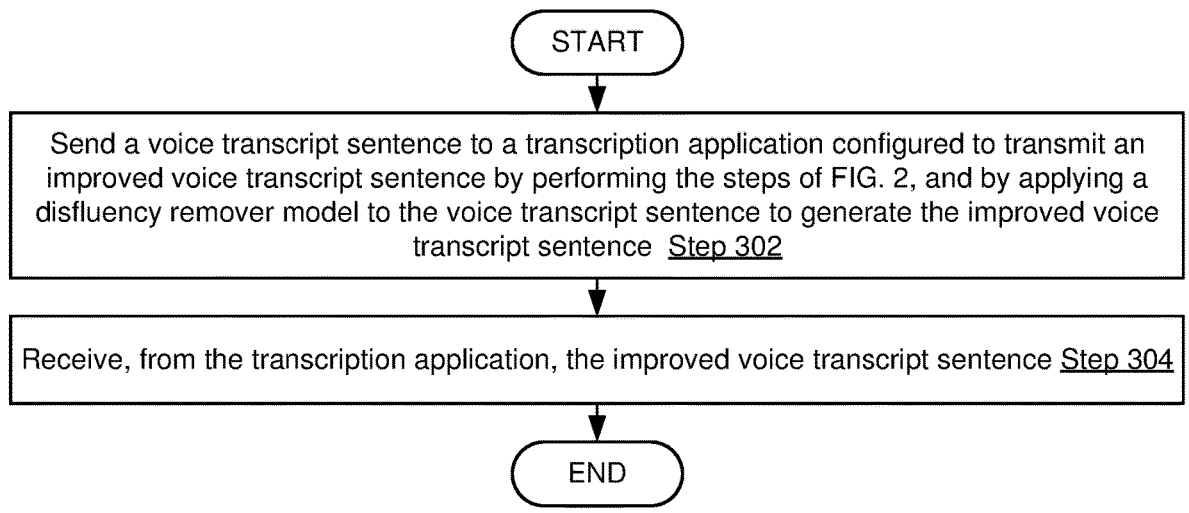

FIG. 3 shows a flowchart in accordance with one or more embodiments of the invention. The flowchart depicts a process for improving a voice transcript. One or more of the steps in FIG. 3 may be performed by the components (e.g., the sentence extractor (110), sentence embedding model (112), sentence matcher (114), and disfluency remover model (118) of the transcription application (106)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a voice transcript sentence is sent to a transcription application configured to transmit an improved voice transcript sentence by performing the steps of FIG. 2, and by applying a disfluency remover model to the voice transcript sentence to generate the improved voice transcript sentence. The voice transcript sentence may be sent to the transcription application via a network.

In Step 304, the improved voice transcript sentence is received from the transcription application. The improved voice transcript sentence may be received from the transcription application via the network.

Figure 4A:
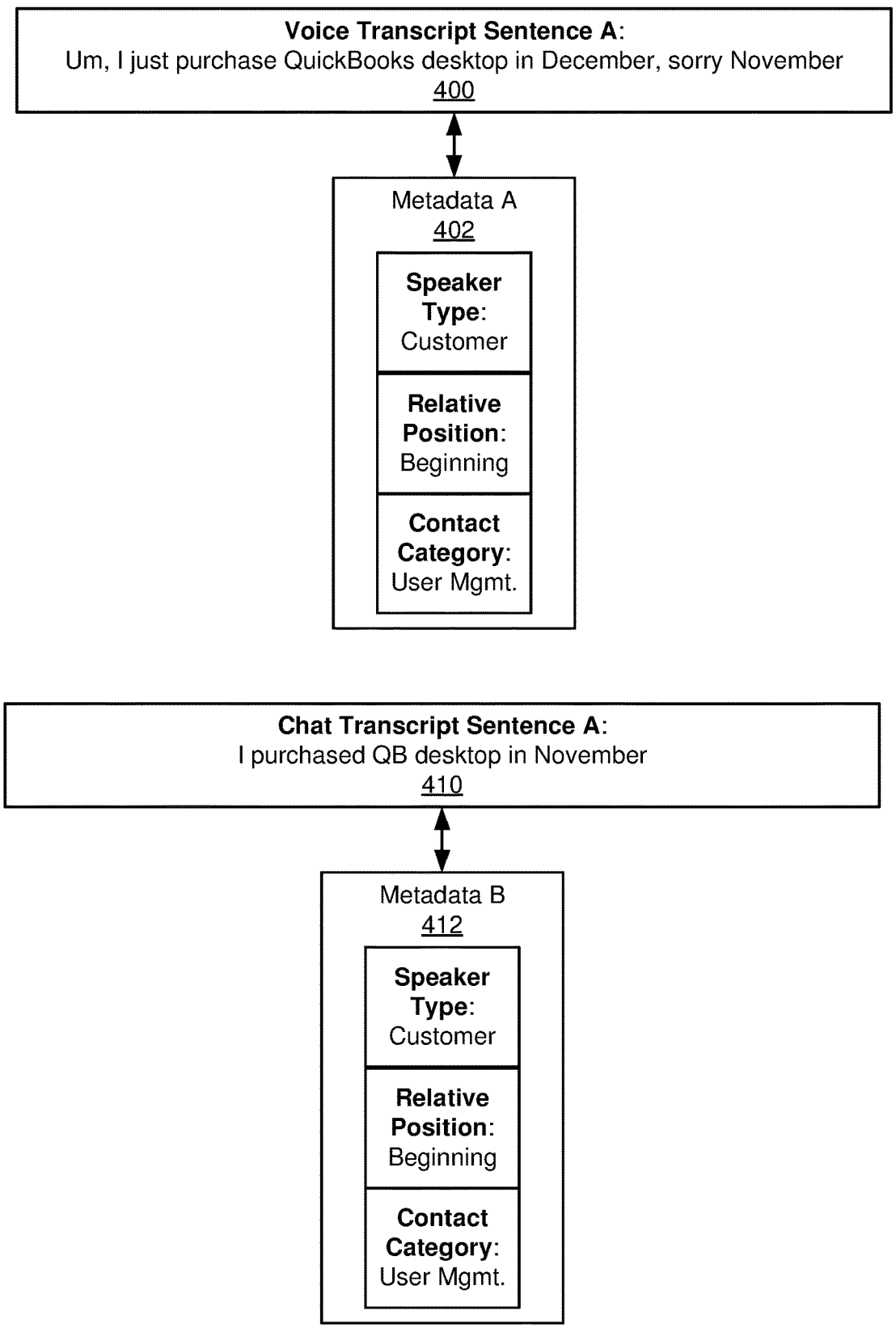
FIG. 4A, FIG. 4B, FIG. 4C, FIG. 4D, and FIG. 4E show examples in accordance with one or more embodiments of the invention.

The following example is for explanatory purposes only and not intended to limit the scope of the invention. FIG. 4A, FIG. 4B, FIG. 4C, FIG. 4D, and FIG. 4E show an implementation example in accordance with one or more embodiments of the invention. FIG. 4A shows voice transcript sentence A (400) ((130) in FIG. 1A and (130A) in FIG. 1B) corresponding to metadata A (402) ((160) in FIG. 1B). FIG. 4A also shows chat transcript sentence A (410) ((132) in FIG. 1A and (132F) in FIG. 1B) corresponding to metadata B (412). Voice transcript sentence A (400) includes disfluencies: filler words "Um" and "just," and a contradiction (e.g., correction) of "December" to "November." Chat transcript sentence A (410) is disfluency-free.

The sentence matcher determines that the semantics of voice transcript sentence A (400) is similar to the semantics of chat transcript sentence A (410) by determining that:

1) the voice sentence vector generated for voice transcript sentence A (400) by the sentence embedding model is similar, based on a cosine similarity, to the chat sentence vector generated by the sentence embedding model for chat transcript sentence A (410); and 2) metadata A (402) corresponding to voice transcript sentence A (400) matches metadata B (412) corresponding to chat transcript sentence A (410). That is, both metadata A (402) and metadata B (412) include the same speaker type, relative position, and contact category.

Figure 4B:
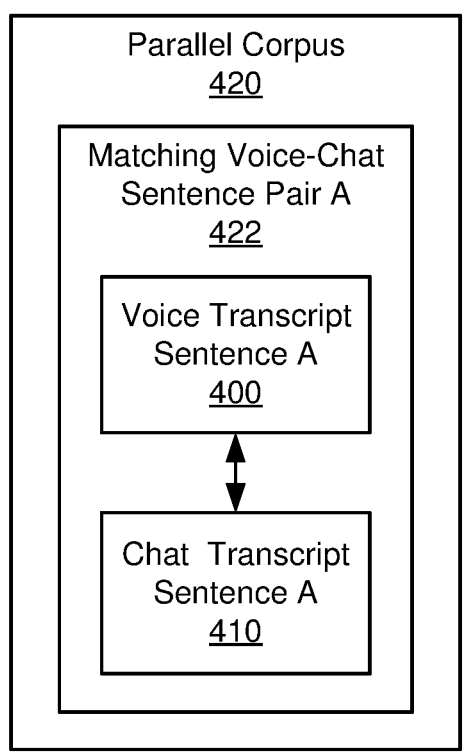

The transcription application then adds matching voice-chat sentence pair A (422) ((140) in FIG. 1A and (140A, 140N) in FIG. 1B) that includes voice transcript sentence A (400) and chat transcript sentence A (410) to a parallel corpus (420) ((116) in FIG. 1A and FIG. 1B), as shown in FIG. 4B. The parallel corpus (420) is used to train a disfluency remover model to learn the relationship between voice transcript sentences represented in a disfluency-including style and chat transcript sentences represented in a disfluency-free style.

Figure 4C:
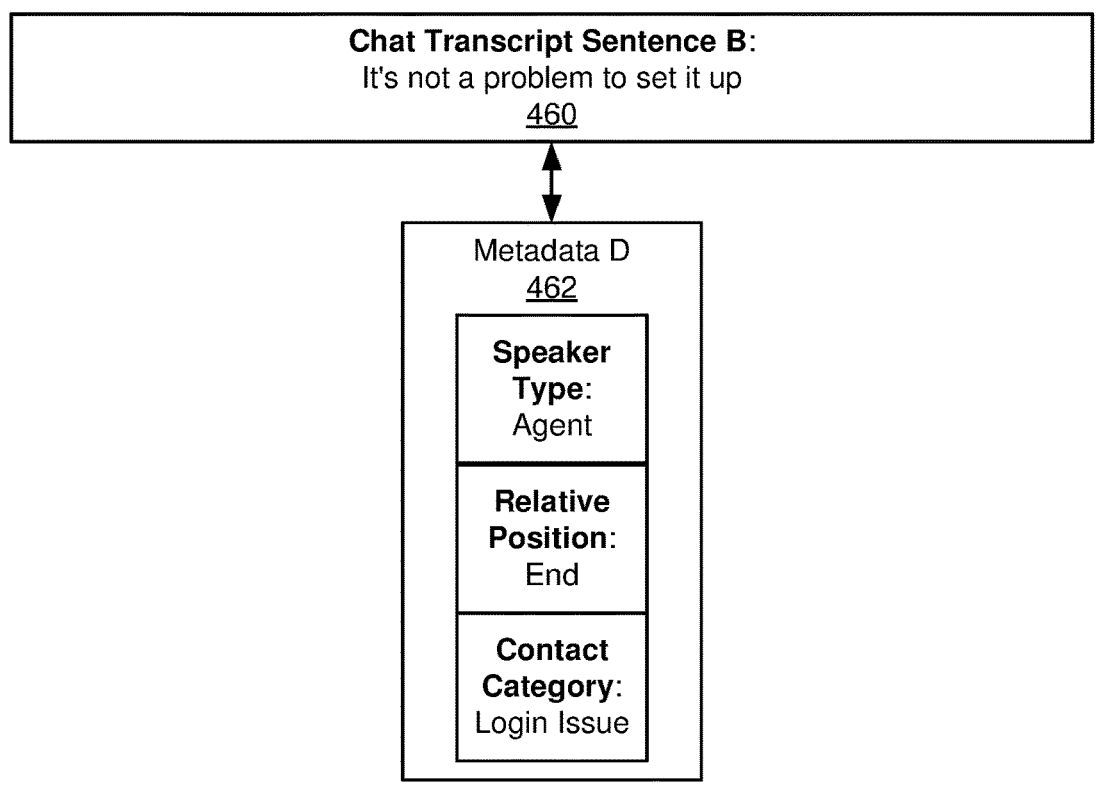

Similar to FIG. 4A, FIG. 4C shows voice transcript sentence B (450) corresponding to metadata C (452) and chat transcript sentence B (460) corresponding to metadata D (462). Voice transcript sentence B (450) includes disfluencies: filler words "Um," "so," "oh," and "of course.". Chat transcript sentence B (460) is disfluency-free.

The sentence matcher determines that the semantics of voice transcript sentence B (450) is similar to the semantics of chat transcript sentence B (460) by determining that:

1) the voice sentence vector generated for voice transcript sentence B (450) by the sentence embedding model is similar, based on a cosine similarity, to the chat sentence vector generated by the sentence embedding model for chat transcript sentence B (460); and 2) metadata C (452) corresponding to voice transcript sentence B (450) matches metadata D (462) corresponding to chat transcript sentence B (460). That is, both metadata C (452) and metadata D (462) include the same speaker type, relative position, and contact category.

Figure 4D:
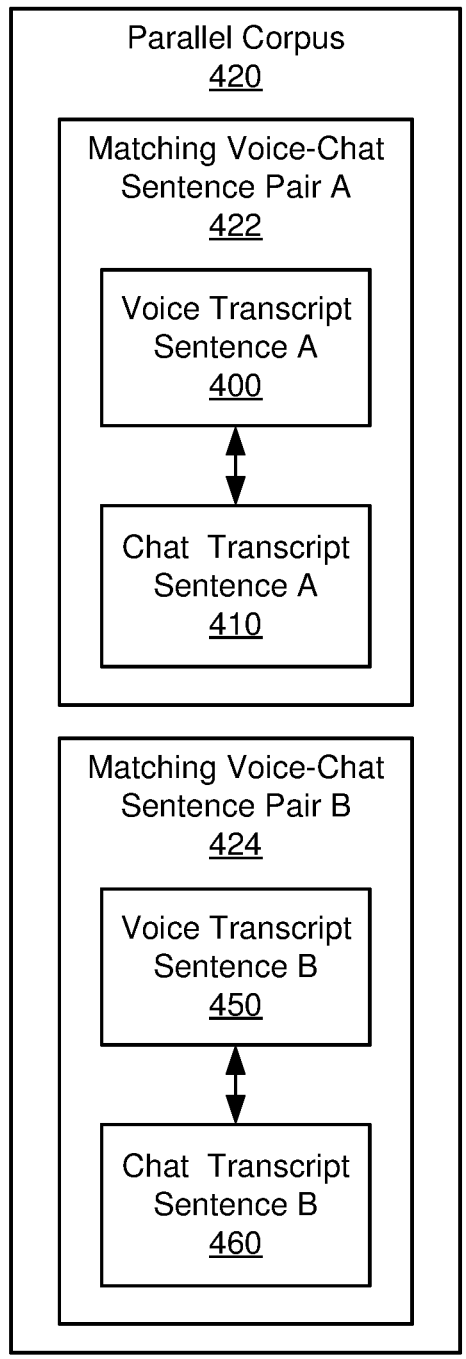

The transcription application then adds matching voice-chat sentence pair B (424) that includes voice transcript sentence B (450) and chat transcript sentence B (460) to the parallel corpus (420), as shown in FIG. 4D.

Figure 4E:
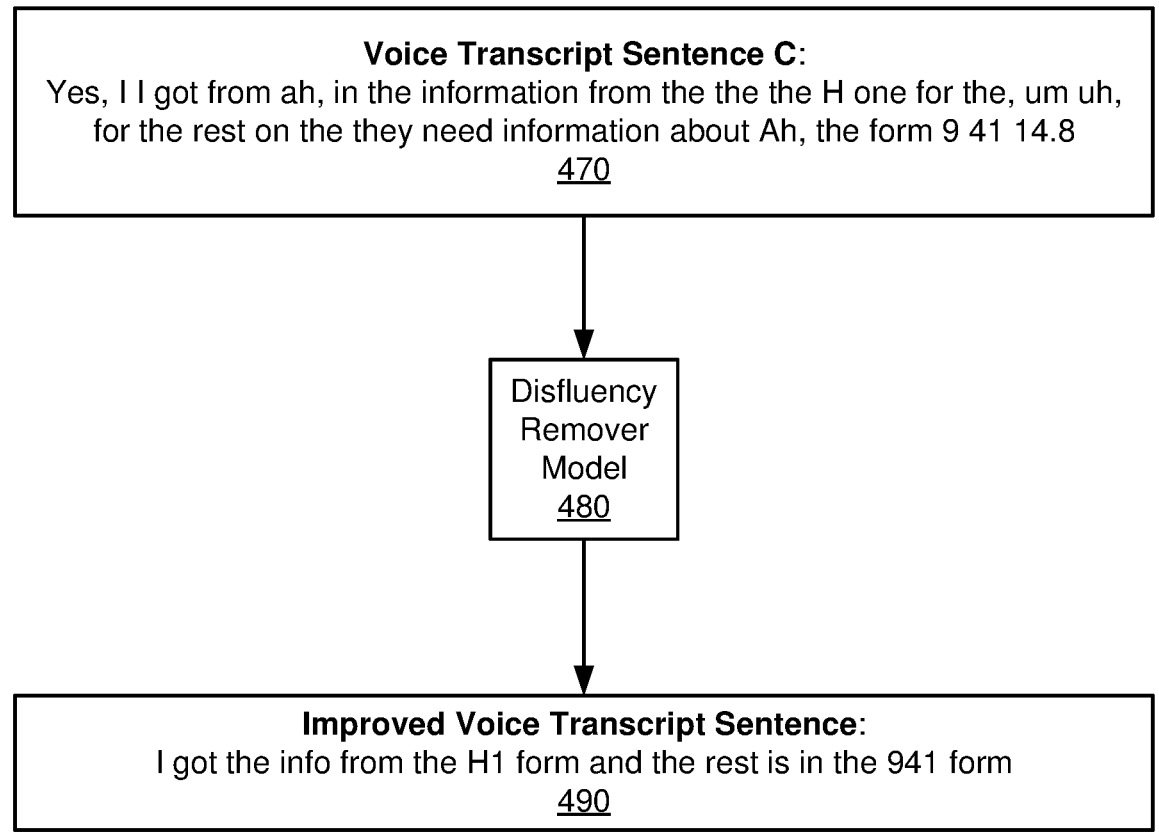

FIG. 4E shows voice transcript sentence C (470) and an improved voice transcript sentence (490) ((144) in FIG. 1A). Voice transcript sentence C (470) includes disfluencies: filler words "Yes," "ah," "um," "uh," etc, and a repetition of the word "the." The improved voice transcript sentence (490) is disfluency-free. The disfluency remover model (480) ((118) in FIG. 1A) generates the improved voice transcript sentence (490) from the voice transcript sentence (470). That is, the disfluency remover model (480) translates voice transcript sentence C (470) represented in a disfluency-including style to the improved voice transcript sentence (490) represented in a disfluency-excluding style.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B.

Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for training a disfluency remover model comprising:
   obtaining a voice transcript corpus and a chat transcript corpus;
   extracting a plurality of voice transcript sentences from the voice transcript corpus and a plurality of chat transcript sentences from the chat transcript corpus;
   encoding, by a series of neural network layers, the plurality of voice transcript sentences to generate a plurality of voice sentence vectors;
   encoding, by the series of neural network layers, the plurality of chat transcript sentences to generate a plurality of chat sentence vectors;
   determining, for each voice sentence vector of the plurality of voice sentence vectors, a matching chat sentence vector to obtain a plurality of matching voice-chat vector pairs;
   adding, to a parallel corpus, a plurality of matching voice-chat sentence pairs using the plurality of matching voice-chat vector pairs, each of the plurality of matching voice-chat sentence pairs comprising a voice transcript sentence and a matching chat transcript sentence corresponding to a voice chat-vector pair of the plurality of voice-chat vector pairs; and
   training the disfluency remover model to remove disfluencies from voice transcripts using the parallel corpus.

2. The method of claim 1, further comprising:
   applying the disfluency remover model to a new voice transcript sentence to generate an improved voice transcript sentence.

3. The method of claim 2,
   wherein the new voice transcript sentence comprises a disfluency,
   wherein the disfluency comprises one of a repeating portion of the new voice transcript sentence and a contradictory portion of the new voice transcript sentence, and
   wherein the improved voice transcript sentence excludes the disfluency.

4. The method of claim 1, further comprising:
   labeling the plurality of voice transcript sentences and the plurality of chat transcript sentences with metadata,
   wherein determining the matching chat sentence vector comprises comparing the metadata labeling the voice transcript sentence corresponding to the voice sentence vector and the metadata labeling the chat transcript sentence corresponding to the matching chat sentence vector.

5. The method of claim 4, wherein the metadata comprises at least one of a speaker type, a relative position, and a contact category.

6. The method of claim 1, wherein determining the matching chat sentence vector comprises:
   calculating a plurality of vector distances between the voice sentence vector and the plurality of chat sentence vectors; and
   determining that a vector distance between the voice sentence vector and the matching chat sentence vector is within a threshold.

7. The method of claim 1, further comprising:
   constructing an approximate nearest neighbor (ANN) index over the plurality of chat sentence vectors, wherein the matching chat sentence vector is determined using the ANN index.

8. A system for training a disfluency remover model comprising:
   a computer processor;
   a repository configured to store a voice transcript corpus and a chat transcript corpus; and
   a transcription application executing on the computer processor and configured to:
      extract a plurality of voice transcript sentences from the voice transcript corpus and a plurality of chat transcript sentences from the chat transcript corpus,
      encode, by a series of neural network layers, the plurality of voice transcript sentences to generate a plurality of voice sentence vectors,
      encode, by the series of neural network layers, the plurality of chat transcript sentences to generate a plurality of chat sentence vectors,
      determine, for each voice sentence vector of the plurality of voice sentence vectors, a matching chat sentence vector to obtain a plurality of matching voice-chat vector pairs,
      add, to a parallel corpus, a plurality of matching voice-chat sentence pairs using the plurality of matching voice-chat vector pairs, each of the plurality of matching voice-chat sentence pairs comprising a voice transcript sentence and a matching chat transcript sentence corresponding to a voice chat-vector pair of the plurality of voice-chat vector pairs, and
      train the disfluency remover model to remove disfluencies from voice transcripts using the parallel corpus.

9. The system of claim 8, wherein the transcription application is further configured to:
   apply the disfluency remover model to a new voice transcript sentence to generate an improved voice transcript sentence.

10. The system of claim 9,
    wherein the new voice transcript sentence comprises a disfluency,
    wherein the disfluency comprises one of a repeating portion of the new voice transcript sentence and a contradictory portion of the new voice transcript sentence, and
    wherein the improved voice transcript sentence excludes the disfluency.

11. The system of claim 8, wherein the transcription application is further configured to:
    label the plurality of voice transcript sentences and the plurality of chat transcript sentences with metadata,
    wherein determining the matching chat sentence vector comprises comparing the metadata labeling the voice transcript sentence corresponding to the voice sentence vector and the metadata labeling the chat transcript sentence corresponding to the matching chat sentence vector.

12. The system of claim 11, wherein the metadata comprises at least one of a speaker type, a relative position, and a contact category.

13. The system of claim 8, wherein the transcription application is further configured to determine the matching chat sentence vector by:
  calculating a plurality of vector distances between the voice sentence vector and the plurality of chat sentence vectors; and
  determining that a vector distance between the voice sentence vector and the matching chat sentence vector is within a threshold.

14. The system of claim 8, wherein the transcription application is further configured to:
  construct an approximate nearest neighbor (ANN) index over the plurality of chat sentence vectors, wherein the matching chat sentence vector is determined using the ANN index.

15. A method for removing disfluency comprising:
  sending a voice transcript sentence to a transcription application, wherein the transcription application is configured to perform:
    obtaining a voice transcript corpus and a chat transcript corpus,
    extracting a plurality of voice transcript sentences from the voice transcript corpus and a plurality of chat transcript sentences from the chat transcript corpus,
    encoding, by a series of neural network layers, the plurality of voice transcript sentences to generate a plurality of voice sentence vectors,
    encoding, by the series of neural network layers, the plurality of chat transcript sentences to generate a plurality of chat sentence vectors,
    determining, for each voice sentence vector of the plurality of voice sentence vectors, a matching chat sentence vector to obtain a plurality of matching voice-chat vector pairs, and
    adding, to a parallel corpus, a plurality of matching voice-chat sentence pairs using the plurality of matching voice-chat vector pairs, each of the plurality of matching voice-chat sentence pairs comprising a voice transcript sentence and a matching chat transcript sentence corresponding to a voice chat-vector pair of the plurality of voice-chat vector pairs,
    training a disfluency remover model using the parallel corpus,
    applying the disfluency remover model to the voice transcript sentence to generate an improved voice transcript sentence, and
    transmitting the improved voice transcript sentence; and
  receiving, from the transcription application, the improved voice transcript sentence.

16. The method of claim 15,
  wherein the voice transcript sentence comprises a disfluency,
  wherein the disfluency comprises one of a repeating portion of the voice transcript sentence and a contradictory portion of the voice transcript sentence, and
  wherein the improved voice transcript sentence excludes the disfluency.

17. The method of claim 15, wherein the transcription application is further configured to perform:
  labeling the plurality of voice transcript sentences and the plurality of chat transcript sentences with metadata,
  wherein determining the matching chat sentence vector comprises comparing the metadata labeling the voice transcript sentence corresponding to the voice sentence vector and the metadata labeling the chat transcript sentence corresponding to the matching chat sentence vector.

18. The method of claim 17, wherein the metadata comprises at least one of a speaker type, a relative position, and a contact category.

19. The method of claim 15, wherein determining the matching chat sentence vector comprises:
  calculating a plurality of vector distances between the voice sentence vector and the plurality of chat sentence vectors; and
  determining that a vector distance between the voice sentence vector and the matching chat sentence vector is within a threshold.

20. The method of claim 15, wherein the transcription application is further configured to perform:
  constructing an approximate nearest neighbor (ANN) index over the plurality of chat sentence vectors, wherein the matching chat sentence vector is determined using the ANN index.

\* \* \* \* \*